(12) United States Patent
Jha et al.

(10) Patent No.: US 9,884,691 B2
(45) Date of Patent: Feb. 6, 2018

(54) HELICOPTER SEARCH LIGHT

(71) Applicant: Goodrich Lighting Systems GmbH, Lippstadt (DE)

(72) Inventors: Anil Kumar Jha, Lippstadt (DE); Christian Schoen, Mainz (DE); Andre Hessling von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 42 days.

(21) Appl. No.: 14/869,122

(22) Filed: Sep. 29, 2015

(65) Prior Publication Data

US 2016/0107767 A1    Apr. 21, 2016

(30) Foreign Application Priority Data

Oct. 20, 2014 (EP) ..................................... 14189556

(51) Int. Cl.
| | | |
|---|---|---|
| *B64D 47/02* | (2006.01) | |
| *B60Q 1/24* | (2006.01) | |
| *F21S 8/00* | (2006.01) | |

(52) U.S. Cl.
CPC ............ *B64D 47/02* (2013.01); *B60Q 1/245* (2013.01); *F21S 8/003* (2013.01); *B64D 2203/00* (2013.01)

(58) Field of Classification Search
CPC ........ B64D 47/02; B64D 47/04; B64D 47/06; B64D 2203/00; B60Q 1/24; B60Q 1/245; F21S 8/003
USPC ................................................ 362/470, 472
See application file for complete search history.

(56) References Cited

U.S. PATENT DOCUMENTS

| | | | | |
|---|---|---|---|---|
| 2,712,060 | A * | 6/1955 | Johnson ................. | B60Q 1/245 362/419 |
| 3,979,649 | A | 9/1976 | Persha | |
| 5,984,494 | A * | 11/1999 | Chapman ............... | B64D 47/04 362/240 |
| 6,879,263 | B2 * | 4/2005 | Pederson ............ | B60Q 1/2611 340/815.45 |
| 6,962,423 | B2 * | 11/2005 | Hamilton ............... | B64D 47/08 362/12 |

(Continued)

FOREIGN PATENT DOCUMENTS

EP         1650078 A1    4/2006

OTHER PUBLICATIONS

European Search Report for application No. EP 14189556.5; dated May 4, 2015, 6 pages.

*Primary Examiner* — Alan Cariaso
(74) *Attorney, Agent, or Firm* — Cantor Colburn LLP

(57) ABSTRACT

A helicopter search light includes at least one first light source, with the at least one first light source in operation providing a spot light functionality of the helicopter search light, at least one second light source, with the at least one second light source in operation providing a flood light functionality of the helicopter search light, and a switching circuit having a first switching state, with only the at least one first light source being switched on and the helicopter search light providing a pure spot light functionality in the first switching state, and a second switching state, with only the at least one second light source being switched on and the helicopter search light providing a pure flood light functionality in the second switching state.

12 Claims, 4 Drawing Sheets

(56) References Cited

U.S. PATENT DOCUMENTS

| | | | | |
|---|---|---|---|---|
| 8,061,868 B2 * | 11/2011 | Dubord | ............... | B60Q 1/24 |
| | | | | 362/232 |
| 8,836,541 B2 * | 9/2014 | Fidanza | ............. | B64D 47/04 |
| | | | | 340/946 |
| 9,157,623 B2 * | 10/2015 | Hui | ................ | F21V 23/0442 |
| 2003/0086251 A1 | 5/2003 | Hamilton | | |

* cited by examiner

HELICOPTER SEARCH LIGHT

This application claims priority to European Patent Application No. 14189556.5 filed Oct. 20, 2014, the entire contents of which is incorporated herein by reference.

TECHNICAL FIELD

The present invention is in the field of exterior helicopter lighting. In particular, the present invention relates to helicopter search lights.

BACKGROUND OF THE INVENTION

Most helicopters are equipped with so-called helicopter search lights. Such lights are provided for illuminating the environment of the helicopter, in particular for illuminating the ground close to the helicopter. These helicopter search lights are mainly used for inspecting the ground for potential obstacles, such as power lines, tress, etc., during a landing approach.

Prior art helicopter search lights have not been satisfactory in all operating conditions. In particular, in foggy, rainy or snowy conditions, prior art helicopter search lights produce a large quantity of undesired reflections, which glare the pilot. As a consequence, many pilots tend to turn off the helicopter search lights in mesopic viewing conditions, particularly when it is foggy, rainy or snowy, which may lead to a dangerous loss of awareness of the environment during landing approaches.

Accordingly, it would be beneficial to provide a helicopter search light that provides for a reduction of undesired reflections and pilot glare in adverse operating conditions.

SUMMARY

Exemplary embodiments of the invention include a helicopter search light, comprising at least one first light source, with the at least one first light source in operation providing a spot light functionality of the helicopter search light, at least one second light source, with the at least one second light source in operation providing a flood light functionality of the helicopter search light, and a switching circuit having a first switching state, with only the at least one first light source being switched on and the helicopter search light providing a pure spot light functionality in the first switching state, and a second switching state, with only the at least one second light source being switched on and the helicopter search light providing a pure flood light functionality in the second switching state.

Exemplary embodiments of the invention allow for using the helicopter search light in two different modes of operation that can be entered independently from each other. In particular, the pure spot light functionality, also referred to as pure spot light mode, provides for a narrow spot light beam that illuminates the ground in a particular direction. By illuminating a particular direction only, the number of particles that can cause undesired reflections is kept low, such that the adverse glare effects exerted on the pilot are kept low. The pure flood light functionality allows the pilot to obtain good visibility in one direction in all operating conditions, which is generally sufficient for a safe landing. In this way, the pure flood light functionality provides for a good compromise between limiting the illumination angle and reducing undesired reflections. On the other hand, the pure spot light functionality allows the pilot to have good wide angle visibility, when conditions permit. In other words, when no foggy, rainy or snowy conditions are present, which may create a lot of undesired reflections, the pilot can get a lot of awareness for a large portion of the environment via the flood light functionality, also referred to as flood light mode.

Moreover, the pure flood light functionality has a further advantage as compared to prior art approaches that have a combined spot light and flood light functionality. As the human eye tends to adjust to the brightest spot in the field of vision, the flood light illumination of a combined spot light and flood light functionality is less efficient. The pilot's eye adjusts to the spot light and the area illuminated by the flood light is perceived as not well-illuminated by the pilot. In contrast thereto, when the environment is illuminated only via the pure flood light functionality, the pilot's perception of the entire illuminated area is not impaired by a strong spot light beam, to which the human eye would adapt. Accordingly, the pilot perceives more of the environment in the pure flood light functionality case than in a combined spot light and flood light functionality case.

The separation of the spot light functionality and the flood light functionality thus allows for providing efficient illumination both in optimal viewing conditions as well as in adverse visibility conditions, such as in rainy, foggy or snowy conditions. The pilot glare may be kept low by entering the first switching state. The environment awareness may be kept high in good viewing conditions in the second switching state. The pure spot light mode may provide good illumination in the far field, irrespective of the weather conditions, while the pure flood light mode may provide good illumination in the near field, in particular in good viewing conditions. Overall, the flying safety is greatly enhanced by providing for the option of switching between a pure spot light functionality and a pure flood light functionality.

The flood light functionality of the helicopter search light has a wider opening angle than the spot light functionality of the helicopter search light. The opening angle of the helicopter search light in the flood light mode may be greater than 90°, in particular greater than 110°. In contrast thereto, the opening angle of the helicopter search light in the spot light mode may be less than 20°, in particular less than 15°, further in particular less than 10°, and even further in particular less than 5°.

When the flood light functionality is provided, the helicopter search light has a lower peak light intensity than in the case, when the spot light functionality is provided. In particular, the peak light intensity of the flood light functionality may have a light intensity of less than 5%, in particular of less than 1%, as compared to the peak light intensity of the spot light functionality. The helicopter search light may have the respective peak light intensity in the same direction both in the pure flood light functionality and the pure spot light functionality.

In the first switching state, the at least one first light source is switched on and none of the at least one second light source is switched on. In this way, the helicopter search light only provides its spot light functionality, i.e. it provides a pure spot light functionality. In the second switching state, the at least one second light source is switched on and none of the at least one first light source is switched on. In this way, the helicopter search light only provides its flood light functionality, i.e. provides a pure flood light functionality. In the first switching state, only the at least one first light source is supplied with electric power. In the second switching state, only the at least one second light source is supplied with electric power. In other words, only the at least one first light source is activated in the first switching state, whereas only the at least one second light source is activated in the second switching state.

The switching circuit may have various configurations for making the pure spot light functionality and the pure flood light functionality possible. In particular, separate switches may be provided for the at least one first light source and for the at least one second light source, such that those two groups of light sources/those two individual light sources may be switched on and off separately and completely independently from each other. It is, however, also possible that a general on/off switch for the helicopter search light as a whole is provided and that a second switch is provided for switching back and forth between the pure spot light functionality and the pure flood light functionality.

According to a further embodiment, the helicopter search light further comprises at least one first optical system, with each of the at least one first light source being associated with a respective first optical system for collimating the light emitted by the respective first light source. There may be an equal number of first light sources and first optical systems. Each first light source is associated with exactly one first optical system, with that first optical system collimating the light emitted by exactly that first light source. In this way, the light emitted by a first light source is transformed into a collimated beam, with all the collimated beams of the several first light sources, if present, combining to an overall collimated beam, which provides the spot light functionality of the helicopter search light.

The term collimating refers to a bundling of the light rays emitted by the at least one first light source. In particular, the light rays may be reflected or refracted towards the main output direction of the collimated light beam. The term collimating does not require all light rays to be exactly in the same output direction. Rather, the term collimating refers to a bundling of the light, emitted by the at least one first light source, into a spot light with a small opening angle, such as an opening angle of less than 10°, in particular of less than 5°.

According to a further embodiment, each of the at least one first optical system comprises one of a collimating reflector and a collimating lens and a combination of a collimating reflector and a collimating lens. In other words, the collimating operation may be performed by a collimating reflector, such as a parabolic reflector, or by a collimating lens or by a combination of a collimating reflector and a collimating lens. In the latter case, each of the collimating reflector and the collimating lens may transform different portions of the light emitted by the respective first light source.

According to a further embodiment, the helicopter search light further comprises at least one second optical system, with each of the at least one second light source being associated with a respective second optical system for transforming the light emitted by the respective second light source into a stray light distribution. This stray light distribution provides for the flood light functionality of the helicopter search light. Accordingly, the stray light distribution may also be referred to as the flood light distribution, with the term stray/flood light distribution referring to the light intensity distribution emitted by the helicopter search light in the second switching state of the switching circuit.

According to a further embodiment, each of the at least one second optical system comprises one of a reflector and a lens. In other words, the stray light distribution may be created from the light intensity distribution, as emitted by the respective second light source, by a reflector or by a lens.

It is also possible that the second optical system comprises a combination of one or more lenses and/or one or more reflectors.

According to a further embodiment, the stray light distribution has an opening angle of at least 90°, in particular of at least 110°, in all cross-sections through the respective second light source. The cross-sections through the respective second light source include the direction extending normal to the helicopter search light from the second light source. In other words, the cross-sections through the respective second light source contain the main light emission direction of the second light source. The feature of the stray light distribution having an opening angle of at least 90°, in particular of at least 110°, in all cross-sections may also be expressed as the stray light distribution covering a cone whose rotationally symmetric side wall has an angle of at least 45°, in particular of at least 55°, with respect to the main light emission direction. In yet other words, it can be said that the opening angle of the stray light distribution is at least +/−45°, in particular +/−55°, in two orthogonal dimensions with respect to the direction normal to the helicopter search light. By providing such a wide opening angle, a large portion of the environment may be perceived and inspected by the pilot, when the flood light functionality is switched on. As explained above, the pilot's eye may effectively adjust to this field of illumination, because it is not distracted in its perception by an additional spot light beam.

According to a further embodiment, a ratio between a maximum illuminance value and a minimum illuminance value within the opening angle of 90° at a distance of 30 m from the helicopter search light is less than 15, in particular less than 10, for the switching circuit being in the second switching state. In this way, the pilot may perceive the area illuminated by the stray light distribution to be fairly evenly illuminated. The pilot's eye may inspect the illuminated area similar to an inspection during daylight and may be naturally drawn to objects of interest or dangerous structures within the illuminated area.

According to a further embodiment, a ratio between a maximum illuminance value and a minimum illuminance value within an opening angle of 70° at a distance of 30 m from the helicopter search light is less than 10, in particular less than 7, for the switching circuit being in the second switching state. It has been found that a ratio of less than 10, in particular of less than 7, within an opening angle of 70° allows for a particularly good inspection of the illuminated area by the pilot. Within these limits, the pilot's eye may adapt particularly well to the illumination in the pure flood light mode.

According to a further embodiment, an illuminance distribution at a distance of 30 m from the helicopter search light is monotonically decreasing from a central main light emission direction outwards, for the switching circuit being in the second switching state. In particular, the illuminance distribution may be strictly monotonically decreasing. Such a decreasing illuminance distribution is perceived as a particularly good illumination of the area to be inspected. Non-monotonic portions of an illuminance distribution would be perceived as holes in the illuminated area. In the absence of such perceived holes, the pilot's eye is able to inspect the illuminated area particularly well.

According to a further embodiment, the helicopter search light further comprises a distance sensor for sensing if an object is within a predefined distance of the helicopter search light, with the distance sensor being coupled to the switching circuit and with the switching circuit being configured to switch to the second switching state upon the distance sensor detecting an object within the predefined distance. In this way, the pilot may fly the helicopter with the helicopter search light being in the first switching state, such that the pilot can closely inspect objects that are far removed via the spot light beam. However, in the event of an unexpected obstacle, such as a power line or a tree, appearing within the predefined distance of the helicopter search light, such an automatic switch to the pure flood light functionality may give the pilot the awareness the unexpected obstacle requires.

According to a further embodiment, the predefined distance is between 20 m and 40 m, in particular between 25 m and 35, further in particular about 30 m. It has been found that these values are a good compromise between allowing the pilot to use the spot light functionality to a sufficient extent, while switching to the flood light functionality early enough when the helicopter gets in close proximity to other objects. It is apparent that these values are based on particular assumptions with respect to the landing approach speed and that other values are also possible, depending on the flight scenarios.

According to a further embodiment, the distance sensor is a laser distance sensor.

It is pointed out that it is also possible that the switching between the first switching state and the second switching state may rely on manual inputs only and that no automatic switching is present at all.

According to a further embodiment, each of the at least one first light source is an LED and/or each of the at least one second light source is an LED. Light emitting diodes are a particularly suitable form of first and/or second light sources, because they are energy efficient, highly powerful in terms of light yield, and highly reliable. They are also particularly well-suited for the at least one first light source, because many LED's have a high inherent directivity, making the collimating of the light easier.

According to a further embodiment, each of the at least one second light source has an S/P ratio of greater than 1.5, in particular of greater than 1.7. The S/P ratio is a known measure that represents the extent to which a light source effectively stimulates the rods in the eye. By providing the at least one second light source with such a high S/P ratio, the helicopter search light allows for the pilot to see particularly well in the flood light mode, in particular in mesopic viewing conditions, such as during dusk or dawn.

According to a further embodiment, the helicopter search light further comprises at least one third light source, with the at least one third light source in operation emitting infrared light and providing a covert spot light functionality of the helicopter search light, wherein the switching circuit has a third switching state, with only the at least one third light source being switched on and the helicopter search light providing a pure covert spot light functionality in the third switching state. In this way, the pilot also has the option of using the helicopter search light as an infrared light source with a high directivity, such that the close inspection in the far field, which was described above with respect to the pure spot light functionality, may also be carried out at night in an unnoticed manner. All modifications, features and associated structures, including the first optical system(s) for collimating the light of the at least one first light source, are equally applicable to the at least one third light source and to the spot light distribution that can be achieved therewith.

According to a further embodiment, the number of first light sources is between 4 and 10, in particular between 6 and 8, further in particular 7.

According to a further embodiment, the number of second light sources is between 4 and 8, in particular between 5 and 7, further in particular 6.

According to a further embodiment, the stray light distribution may have an opening angle of at least 110° and the minimum illuminance at a distance of 30 m may be 1.5 lux. Further, the maximum illuminance within the illuminated region at a distance of 30 m may be between 4 lux and 20 lux, in particular between 6 lux and 15 lux.

According to a further embodiment, the electric power consumption of the helicopter search light may be between 30 W and 150 W, in particular between 50 W and 100 W. The helicopter search light may consume comparable amounts of electric power in the pure spot light mode and the pure flood light mode. The ratio between the two power consumptions may be between 2:1 and 1:2.

Exemplary embodiments of the invention further include a helicopter comprising at least one helicopter search light according to any of the embodiments described above. All modifications and advantages discussed above with respect to the helicopter search light apply to the helicopter in an analogous manner.

BRIEF DESCRIPTION OF DRAWINGS

Further exemplary embodiments are described with respect to the accompanying drawings, wherein.

DETAILED DESCRIPTION OF THE INVENTION

Figure 1:
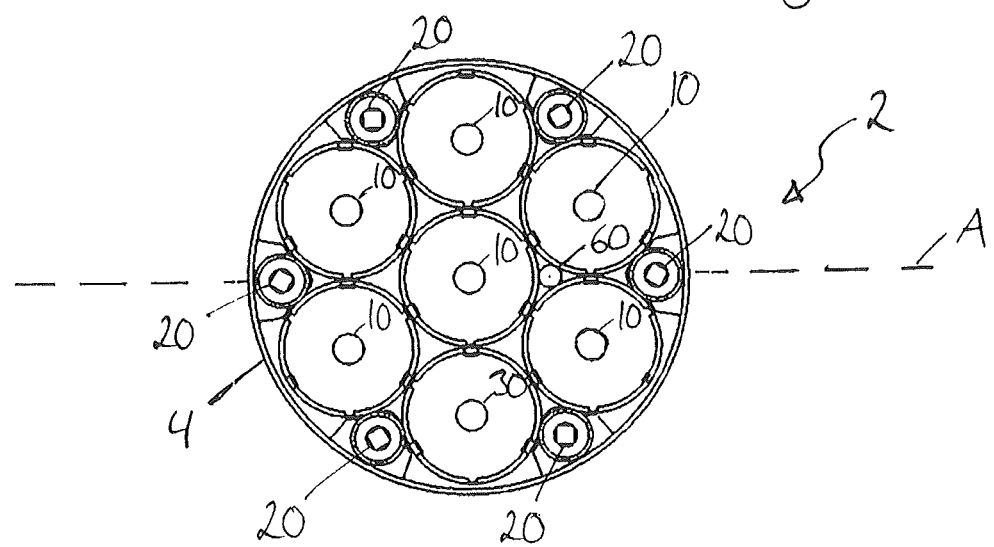
FIG. 1 shows a top view of a helicopter search light in accordance with an exemplary embodiment of the invention.

FIG. 1 shows a helicopter search light 2 in accordance with an exemplary embodiment of the invention in a top view. The helicopter search light 2 has a cylindrical housing 4, whose upper edge is shown as a circle in the top view of FIG. 1.

Arranged within the housing, there are provided 6 first light sources 10 and one third light source 30, each of the first and third light sources 10, 30 having an optical system associated therewith. Each of the first light sources has a respective first optical system associated therewith, while the third light source has a third optical system associated therewith. In the exemplary embodiment of FIG. 1, the first optical system and the third optical system are of identical design. The respective combinations of the light sources and the optical systems are also cylindrical in shape. They have a size that the arrangement of six of these seven combinations around one of these seven combinations fills the housing 4 in such a manner that these seven combinations touch each other and cannot be packed more tightly. It is pointed out that it is also possible that seven first light sources and seven first optical systems are provided in the exemplary embodiment of FIG. 1.

In the spaces between said seven combinations, consisting of said light sources 10, 30 and the associated optical systems, and the housing 4, six second light sources 20 are arranged. Each of the second light sources 20 is associated with a respective second optical system. These combination, consisting of a second light source 20 and an associated second optical system, are each packed between two of the first/third light sources 10, 30 and the wall of the housing 4.

The helicopter search light 2 further comprises a distance sensor 60 that is arranged between three of the first light sources 10.

Figure 2:
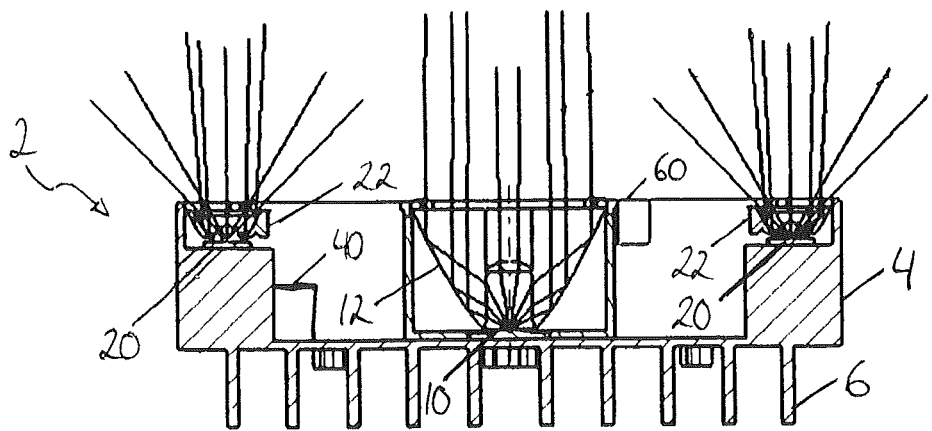
FIG. 2 shows a cross-sectional view through the helicopter search light of FIG. 1.

The helicopter search light 2 of FIG. 1 is shown in a cross-sectional view in FIG. 2. The cross-sectional plane of FIG. 2 is along line A, depicted in FIG. 1. The cross-sectional view of FIG. 2 shows the straight extension (in the top/bottom dimension) of the cylindrical wall of the housing 4. The helicopter search light 2 has a light emission side, depicted as the top side in the viewing plane of FIG. 2, and a heat discharge side, depicted as the bottom side in the viewing plane of FIG. 2. For said heat discharge, the housing 4 is equipped with a cooling rib structure 6, which forms a heat sink for the light sources arranged within the housing 4.

The first light source 10 that can be seen in the cross-sectional view of FIG. 2 is arranged in the middle of the housing 4. A first optical system 12 is arranged above and around the first light source 10. The first optical system 12 comprises a collimating lens and a collimating reflector. As illustrated by the exemplary light rays of FIG. 2, the collimating lens and the collimating reflector alter the direction of the light rays, emitted by the first light source 10, in such a way that they all leave the helicopter search light 2 in the same direction, namely towards the top in the viewing plane of FIG. 2.

The two second light sources 20 that can be seen in the cross-sectional view of FIG. 2 are arranged adjacent the side wall of the housing 4 on opposite sides of the side wall. In other words, one second light source 20 is arranged adjacent the side wall of the housing 4 on the right side of the helicopter search light 2 in the viewing plane of FIG. 2, while the other second light source 20 is arranged adjacent the side wall of the housing 4 on the left side of the helicopter search light 2 in the viewing plane of FIG. 2.

Each of the two second light sources 20 has a second optical system 22 associated therewith. The second optical systems 22 are arranged above and around the second light sources 20 in the viewing plane of FIG. 2. In the exemplary embodiment of FIG. 2, each second optical system 22 comprises a reflector. The reflector reflects part of the light emitted by the respective second light source 20 towards the main light emission direction, i.e. towards the direction normal to the housing 4, i.e. normal to the whole helicopter search light 2. Much of the light of the second light sources 20 leaves the helicopter search light 2 in an unaltered manner. Overall, the second optical system 22 is designed in such a way that a controlled stray light distribution leaves the helicopter search light 2. This is illustrated by the exemplary light rays of FIG. 2 and will be discussed in greater detail below.

The helicopter search light 2 further comprises a switching circuit 4. The switching circuit 4 is coupled to a power source, to the first, second and third light sources 10, 20, 30 and to the distance sensor 60.

All of the first, second and third light sources 10, 20, 30 are LED's in the exemplary embodiment of FIGS. 1 and 2. The first and second light sources 10, 20 are LED's emitting light in the visible light range. The third light source 30 is an LED emitting light in the infrared range, i.e. light that is not visible to the human eye.

FIG. 3 shows two exemplary implementations of the switching circuit 40. For simplicity, FIG. 3 shows the switching circuit 40 for the case that the helicopter search light 2 does not have a third light source, i.e. that the helicopter search light 2 only has one or more first light source(s) 10 and one or more second light source(s) 20. Based on the following discussion of the exemplary embodiments of the switching circuit 40, the extension to the case of one or more third light source(s) 30 being present in the helicopter search light is also apparent.

In both of the exemplary implementations, the switching circuit 40 has a power input 42, a first power output 44 and a second power output 46. The power input 42 is coupled to a power source. The first power output 44 is coupled to the first light source(s) 10, the second power output 46 is coupled to the second light source(s) 20.

Figure 3A:
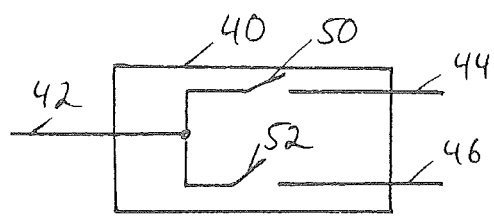
FIG. 3a-FIG. 3b shows two exemplary implementations of the switching circuit to be used in helicopter search lights in accordance with exemplary embodiments of the invention.

The switching circuit 40 of FIG. 3*a* comprises a first switch 50 that selectively couples the power input 42 to the first power output 44. In other words, when the first switch 50 is closed, the power input 42 is connected to the first power output 44 and the first light source(s) 10 are provided with electric power. The first light source(s) 10 are switched on.

The switching circuit 40 of FIG. 3*a* further comprises a second switch 52 that selectively couples the power input 42 to the second power output 46. In other words, when the second switch 52 is closed, the power input 42 is connected to the second power output 46 and the second light source(s) 20 are provided with electric power. The second light source(s) 20 are switched on.

The first switch 50 and the second switch 52 are completely independent from each other. Accordingly, two separate decisions can be made if and when the first light source(s) 10 and the second light source(s) 20 are provided with electric power. When the first switch 50 is closed, the first light source(s) 10 is/are illuminated and provide spot light functionality. When the second switch 52 is closed, the second light source(s) 20 is/are illuminated and provide flood light functionality. In the exemplary embodiment of FIG. 3*a*, pure spot light functionality as well as pure flood light functionality as well as a combined spot light and flood light functionality are possible, depending on the switching state of the first and second switches 50, 52.

Figure 3B:
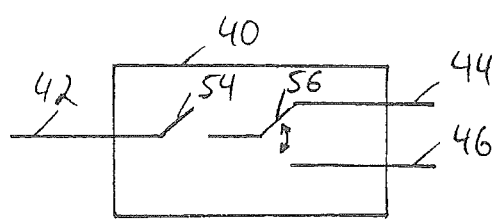

The switching circuit 40 of FIG. 3*b* is different in this respect, because is enables the pure spot light functionality and the pure flood light functionality, but does not enable the combined spot light and flood light functionality. The switching circuit 40 of FIG. 3*b* comprises a search light on/off switch 54, which selectively puts the helicopter search light as a whole in the on state. When the search light on/off switch 54 is closed, the helicopter search light operates in one of the pure spot light functionality and the pure flood light functionality. The switching circuit 40 of FIG. 3*b* further comprises a mode selection switch 56 that switches the helicopter search light 2 between the pure spot light functionality and the pure flood light functionality. When the search light on/off switch 54 is closed, the mode selection switch 56 switches between connecting the first power output 44 to the power input 42 and connecting the second power output 46 to the power input 42. In this way, either the one or more first light sources 10 are provided with electric power or the one or more second light sources 20 are provided with electric power.

Figure 4:
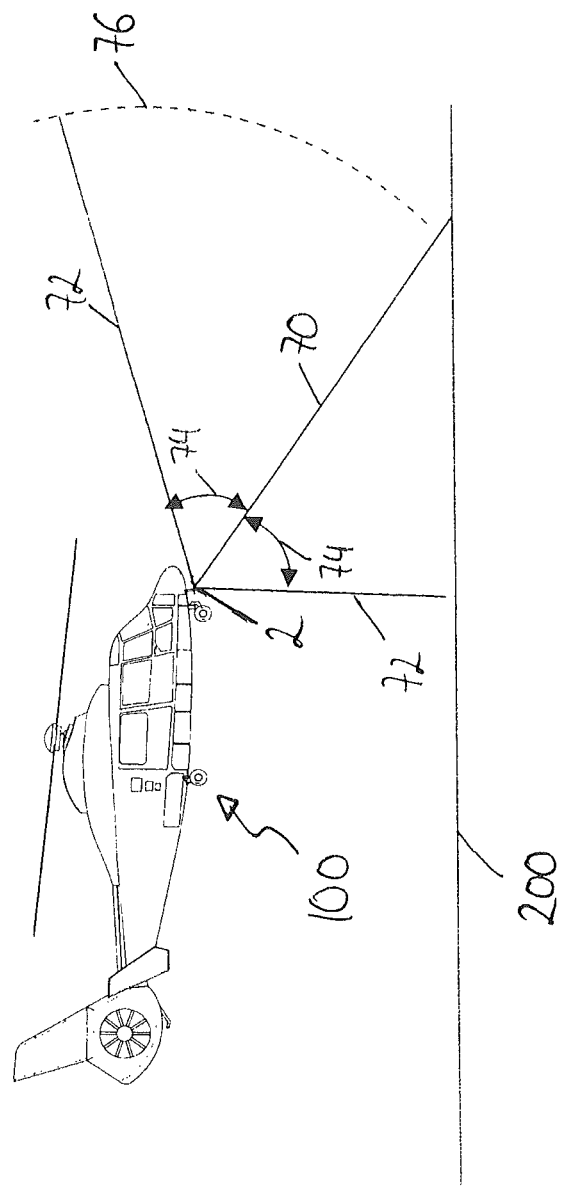
FIG. 4 shows a helicopter with a helicopter search light in accordance with an exemplary embodiment of the invention.

The operation of the exemplary helicopter search light 2 is now described with respect to FIG. 4. In FIG. 4, a helicopter 100 is shown that flies above ground 200. The helicopter 100 is equipped with a helicopter search light 2 in accordance with an exemplary embodiment of the invention. The helicopter search light 2 is mounted to a front bottom portion of the helicopter 100, with the direction normal to the helicopter search light 2 being indicated by line 70. Line 70 indicates the main light emission direction of the helicopter search light 2.

As described above, the helicopter search light 2 has at least two modes of operation, namely the pure spot light functionality and the pure flood light functionality. In the spot light mode of operation, a narrow beam of light is emitted by the helicopter search light 2 substantially in the direction of line 70. The pilot may thus inspect the ground 200 at the position where the line 70 and the ground 200 intersect. As all the lighting power of the first light source(s) 10 is bundled into the main light emission direction 70, this illuminated portion of the ground 200 is brightly illuminated. A close and thorough inspection by the pilot is made possible.

In the flood light mode, the lighting power of the second light source(s) 20 is distributed between the lines 72, which define a cone around the main light emission direction 70, which cone has an opening angle of 90°, which is indicated by the two 45° angles 74. In this way, the pilot may inspect a larger portion of the environment. As the lighting power of the second light source(s) 20 is distributed over a larger angular region and thus over a larger area, the illuminance reaching the ground is less than in the spot light mode.

The dashed line 76 illustrates a circle of about 30 m distance with respect to the helicopter search light 2. In three dimensions, this limit may be a sphere of about 30 m distance with respect to the helicopter search light 2. This distance of 30 m is a predefined value for the distance sensor 60. If the distance sensor 60 detects an object within this predefined distance of 30 m, it causes the switching circuit 40 to switch into the pure flood light mode. The rationale behind this switching is that an object within 30 m is an indication of a potentially dangerous situation to the helicopter 100 that requires the pilot's attention. This attention may be gained by providing a broad illumination of the environment. In the exemplary situation depicted in FIG. 4, if this automatic switching is enabled, the distance sensor 60 causes the switching circuit 40 to put the helicopter search light 2 in the pure flood light mode, because the ground is closer than 30 m to the helicopter 100.

Figure 5:
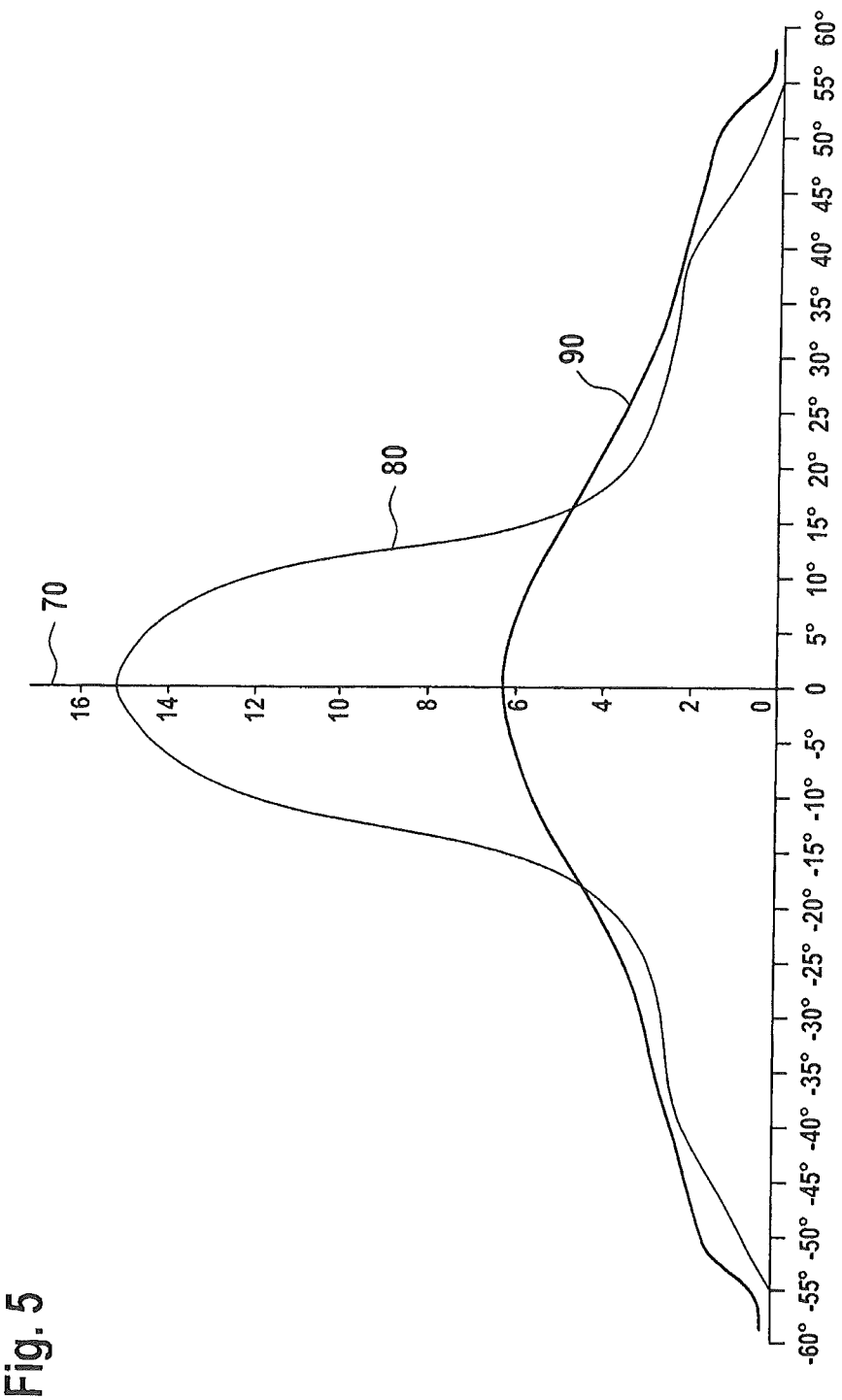
FIG. 5 shows two exemplary flood light distributions of helicopter search lights in accordance with exemplary embodiments of the invention.

FIG. 5 shows two exemplary stray light distributions, also referred to as flood light distributions, which an exemplary helicopter search light 2 may emit when operated in the pure flood light mode. The stray light distributions show illuminance values at a distance of 30 m from the helicopter search light 2 vs. angular values with respect to the main light emission direction 70. The first stray light distribution 80 is an exemplary stray light distribution that may be achieved with the second optical system 22, shown in FIG. 2. As the second optical system 22 only comprises one reflector and does not alter much of the light emitted by the second light source 20, a comparably strong peak around the main light emission direction 70 is provided. The maximum illuminance value is about 15 lux.

The second stray light distribution 90 is an alternative stray light distribution. This stray light distribution 90 may for example be achieved with an alternative second optical system having a lens. This lens may re-direct some of the light, emitted by the second light source close to the main light emission direction, towards wider angles, realising an overall more even illuminance distribution. The maximum illuminance value is about 6 lux. For both stray light distributions 80 and 90, the illuminance value at 45° with respect to the main light emission direction 70 is between 1.5 and 2 lux.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. Helicopter search light, comprising:
   at least one first light source, with the at least one first light source in operation providing a spot light functionality of the helicopter search light,
   at least one second light source, with the at least one second light source in operation providing a flood light functionality of the helicopter search light,
   a switching circuit having a first switching state, with only the at least one first light source being switched on and the helicopter search light providing a pure spot light functionality in the first switching state, and a second switching state, with only the at least one second light source being switched on and the helicopter search light providing a pure flood light functionality in the second switching state,
   at least one first optical system, with each of the at least one first light source being associated with a respective first optical system for collimating the light emitted by the respective first light source, and
   at least one second optical system, with each of the at least one second light source being associated with a respective second optical system for transforming the light emitted by the respective second light source into a stray light distribution,
   wherein each of the at least one first light source is an LED or wherein each of the at least one second light source is an LED.

2. Helicopter search light according to claim 1, wherein each of the at least one first optical system comprises one of a collimating reflector and a collimating lens and a combination of a collimating reflector and a collimating lens.

3. Helicopter search light according to claim 1, wherein each of the at least one second optical system comprises one of a reflector and a lens.

4. Helicopter search light according to claim 1, wherein the stray light distribution has an opening angle of at least 90°, in particular of at least 110°, in all cross-sections through the respective second light source.

5. Helicopter search light according to claim 4, wherein, for the switching circuit being in the second switching state, a ratio between a maximum illuminance value and a minimum illuminance value within the opening angle of 90° at a distance of 30 m from the helicopter search light is less than 15, in particular less than 10.

6. Helicopter search light according to claim 1, wherein, for the switching circuit being in the second switching state, a ratio between a maximum illuminance value and a minimum illuminance value within an opening angle of 70° at a distance of 30 m from the helicopter search light is less than 10, in particular less than 7.

7. Helicopter search light according to claim 1, wherein, for the switching circuit being in the second switching state, an illuminance distribution at a distance of 30 m from the helicopter search light is monotonically decreasing from a central main light emission direction outwards.

8. Helicopter search light according to claim 1, further comprising a distance sensor for sensing if an object is within a predefined distance of the helicopter search light, with the distance sensor being coupled to the switching circuit and with the switching circuit being configured to switch to the second switching state upon the distance sensor detecting an object within the predefined distance.

9. Helicopter search light according to claim 8, wherein the predefined distance is between 20 m and 40 m, in particular between 25 m and 35, further in particular about 30 m.

10. Helicopter search light according to claim 1, wherein each of the at least on second light source has an S/P ratio of greater than 1.5, in particular of greater than 1.7.

11. Helicopter search light according to claim 1, further comprising:

at least one third light source, with the at least one third light source in operation emitting infrared light and providing a covert spot light functionality of the helicopter search light, wherein the switching circuit has a third switching state, with only the at least one third light source being switched on and the helicopter search light providing a pure covert spot light functionality in the third switching state.

12. Helicopter comprising at least one helicopter search light according claim 1.

* * * * *